United States Patent [19]

Geisler

[11] 4,372,582

[45] Feb. 8, 1983

[54] STABILIZER FOR ELECTRON DONER-ACCEPTOR CARBONLESS COPYING SYSTEMS

[75] Inventor: Thomas C. Geisler, Cottage Grove, Minn.

[73] Assignee: Minnesota Mining and Manufacturing Company, Saint Paul, Minn.

[21] Appl. No.: 248,843

[22] Filed: Mar. 30, 1981

[51] Int. Cl.[3] .......... B41M 5/14; B41M 5/16; B41M 5/22; C09D 11/00

[52] U.S. Cl. .......... 282/27.5; 106/21; 106/308 N; 252/351; 400/204; 400/237; 400/241.2; 428/194; 428/320.4; 428/320.6; 428/320.8; 428/537; 428/913; 428/914

[58] Field of Search .......... 282/27.5; 428/320.2, 428/320.4, 320.6, 537, 913, 914, 194, 320.8, 488; 427/150, 151; 8/617; 106/21, 308 N; 118/264; 162/140, 162; 400/191, 204, 237, 241.2; 401/52; 252/351

[56] References Cited

U.S. PATENT DOCUMENTS

| | | | |
|---|---|---|---|
| 2,374,862 | 5/1945 | Green | 106/137 |
| 2,505,470 | 4/1950 | Green | 117/36 |
| 2,644,760 | 7/1953 | Ludwig . | |
| 2,929,736 | 3/1960 | Miller et al. | 117/36 |
| 2,972,547 | 2/1961 | Tien | 106/266 |
| 3,020,171 | 2/1962 | Bakan et al. | 117/36.2 |
| 3,076,707 | 2/1963 | Lawton et al. | 430/154 |
| 3,168,864 | 2/1965 | Brandl, Jr. et al. | 101/149.2 |
| 3,193,449 | 7/1965 | Ludwig . | |
| 3,244,548 | 4/1966 | Sullivan | 117/36.2 |
| 3,244,550 | 4/1966 | Farnham et al. | 282/27.5 |
| 3,287,154 | 11/1966 | Haas | 117/36.9 |
| 3,455,721 | 7/1969 | Phillips, Jr. et al. | 117/36.2 |
| 3,466,184 | 9/1969 | Bowler et al. | 117/36.2 |
| 3,672,935 | 6/1972 | Miller et al. | 117/36.8 |
| 3,963,852 | 6/1976 | Baxter | 428/325 |
| 3,995,088 | 11/1976 | Garner et al. | 428/323 |
| 4,038,101 | 7/1977 | Thompson | 106/308 N |
| 4,111,462 | 9/1978 | Lange et al. | 282/27.5 |
| 4,205,865 | 6/1980 | Lange et al. | 282/27.5 |
| 4,223,060 | 9/1980 | Raine et al. | 428/199 |
| 4,232,083 | 11/1980 | Buerkley et al. | 428/307 |

FOREIGN PATENT DOCUMENTS

| | | |
|---|---|---|
| 1356402 | 6/1974 | United Kingdom . |
| 1459417 | 12/1976 | United Kingdom . |

*Primary Examiner*—Bruce H. Hess
*Attorney, Agent, or Firm*—Cruzan Alexander; Donald M. Sell; Jennie G. Boeder

[57] ABSTRACT

A stabilizing agent for use in electron donor-acceptor carbonless copying systems. The stabilizing agent is 2,2′-methylene-bis(4-methyl-6-t-butyl phenol). Systems in which the stabilizing agent is useful comprise a color-forming composition comprising at least one leuco dye which is fadeable or discolorable after development, a color-developing composition comprising an acidic coreactant material capable of reacting with the color-forming composition to provide colored products, and the stabilizing agent. The stabilizing agent prevents discoloration or fade of images produced by reaction of the color-forming composition with the color-developing composition. In a preferred embodiment, the color-forming composition additionally comprises dithiooxamide and/or dithiooxamide derivatives, the color-developing composition additionally comprises a transition metal ion capable of reacting with the dithiooxamide compound to produce a purple-colored product, and the reaction of the color-forming composition with the color-developing composition results in a neutral black colored product.

15 Claims, No Drawings

STABILIZER FOR ELECTRON DONER-ACCEPTOR CARBONLESS COPYING SYSTEMS

FIELD OF THE INVENTION

This invention relates to a composition for use in carbonless copying systems comprising a leuco dye which is capable of reacting with an acidic material to effect distinctive, fade-resistant, colored products in combination with a stabilizing agent. The stabilizing agent is 2,2'-methylene-bis(4-methyl-6-t-butyl phenol) and is capable of preventing fading or discoloring by light or atmosphere of the color produced upon reaction of the leuco dye with acidic materials. The stabilizing agent of the present invention can be in admixture with the unreacted leuco dye without causing the dye to change from its colorless state.

BACKGROUND OF THE INVENTION

In recent years carbonless copying systems have come into wide-spread usage for business records, print-out paper for computers and the like. There is considerable patent literature pertaining to the preparation of pressure-sensitive record material utilizing, in various physical associations or arrangements, a color-forming dye precursor compound, preferably colorless, in conjunction with an image-developing sheet carrying a color-developer material capable of reacting with the dye precursor to produce a visibly colored reaction product. The dye precursor is generally selected from one of a number of chemical classes and contained in some kind of pressure-rupturable or releasable state. The color-developer generally used includes clays such as attapulgite, acid clay, active clay, zeolite and bentonite.

Colorless copying systems operating on the basis of the donor-acceptor mechanism have been plagued with loss of coloration or change in coloration of the developed dye image with exposure to light and ordinary atmosphere. One solution to the instability problem involved the judicious combination of plural dye precursor compounds. One dye was a relatively fast reacting, but relatively fugitive dye, while a second dye was converting from colorless to colored state over prolonged periods of time and, optimally, under essentially the same conditions that accelerated the fading of the first dye. Exemplary of such systems are U.S. Pat. No. 2,505,470 and U.S. Pat. No. 3,455,721. This approach cannot be considered an ideal answer since it necessitates the careful selection of precursors to achieve a compatible combination with appropriately balanced fading characteristics so that the image does not at any time pass through an essentially colorless stage. In addition, the color of the image tended to change with time, which was often disconcerting to the user, and the range of colors that could be conveniently made available is quite limited.

British Pat. No. 1,356,402 published June 12, 1974 discloses a color-developer system which provides colored images with increased resistance to discoloration or fading which system comprises at least one monomeric phenolic compound together with one or more clays. Both the monomeric phenolic compound and the clay are said to act as color developers. The monomeric phenolic compounds disclosed are substituted phenols and polyhydric phenols such as p-cresol, p-phenylphenol, p-bromophenyl-phenols, biphenols, such as o,o'-biphenol, 2,4-xylenol, 2,4-diphenyl phenol, 2-chloro-4-phenylphenol, 2,3,5-trimethylphenol, tetramethyl phenols, 4-phenylpyrocatechol, 4,4'-bi-o-cresol, x,x'diphenyl-4,4'-bi-o-cresol, biphenyl tetrols, 2,4'-methylene diphenol, methylene diresorcinols, 2,2'-methylene-di-p-cresol, methylene bis-(benzyl phenols), p,p'-isopropylidenediphenol, methylene bis-(phenyl phenols), methylene bis-(halophenols), and 4,4'-thiodiphenol.

SUMMARY OF THE INVENTION

According to the present invention there is provided a particular bisphenol stabilizing agent, 2,2'-methylene-bis(4-methyl-6-t-butyl phenol), which does not act as a developer for leuco dyes, in contrast to the monomeric phenolic compounds cited in the above mentioned British Pat. No. 1,356,402, but when present in a system comprising a color-forming leuco dye and an acidic color-developer provides colored images which are resistant to discoloration or fade caused by exposure to sunlight or atmospheric conditions.

Thus, according to one aspect of the present invention there is provided a color-forming composition comprising the stabilizing agent, 2,2'-methylene-bis-(4-methyl-6-t-butyl phenol), and a leuco dye capable of reacting with an acidic color-developing composition, carried in an organic solvent vehicle.

According to another aspect of the present invention there is provided a pressure-sensitive system for forming stable, fade-resistant colored markings from a substantially colorless color-forming composition and a substantially colorless color-developing composition. The system comprises:

(a) a carrier means carrying said color-forming composition, said color-forming material comprising at least one leuco dye which after development is fadeable or discolorable, carried in an organic solvent;

(b) a record sheet having on at least a portion of one major surface said color-developing composition, said color-developing composition comprising an acidic material capable of reacting with said leuco dye to form a colored product;

(c) a stabilizing agent carried in either the color-forming or color-developing composition, said stabilizing agent being 2,2'-methylene-bis(4-methyl-6-t-butyl phenol); and (d) transfer means for transferring at least a portion of said color-forming composition to selected areas of said second sheet having said color-developing composition thereon.

According to a further aspect of the present invention there is provided a system for providing stable fade-resistant neutral black images by using a mixture of particular leuco dyes and dithiooxamide, or derivatives of dithiooxamide, in the color-forming composition, and using an acidic coreactant for the leuco-dyes, in admixture with a transition metal ion capable of reacting with the dithiooxamide compound to form a blue-purple colored product, in the color-developing composition. Again, the stabilizing agent may be included in admixture with, or on the same carrier surface, as either the color-forming or color-developing compositions, or otherwise included so as to be in admixture with the colored product.

DETAILED DESCRIPTION OF THE INVENTION

The color-forming composition of the present invention comprises at least one leuco dye compound which is fadeable or discolorable after development. The color-developing composition of the present invention comprises an acidic coreactant material capable of reacting with the color-forming composition to provide colored products. The color-forming systems of the present invention comprise, in combination, a color-forming composition, a color-developing composition and a stabilizing agent.

The Stabilizer

The stabilizing agent of the present invention is the bisphenol compound, 2,2'-methylene-bis(4-methyl-6-t-butyl phenol),

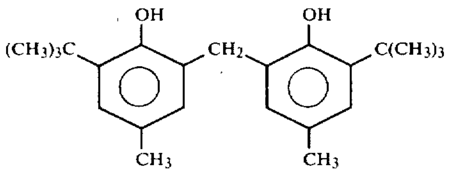

This stabilizing agent is commercially available as "CAO-5" or "CAO-14" from Sherwin Williams, Cleveland, Ohio. This stabilizing agent is unique because it has the ability to prevent discoloration or fading of images formed by the reaction of leuco dyes with acidic color-developer materials, yet will not react to form colored products with the leuco dye. This is surprising in view of the prior art, e.g., U.S. Pat. No. 2,972,547; U.S. Pat. No. 3,672,935; and British Pat. No. 1,356,402 which teaches that phenolic compounds including bisphenols are reactive with leuco dyes to form colored products. Additionally the efficacy of 2,2'-methylene-bis-(4-methyl-6-t-butyl phenol) is surprising in view of the fact that numerous other antioxidants, including phenolic compounds, have not prevented the discoloration of the colored product produced by the reaction of 2-octylamino-6-diethylaminofluoran with acid clays.

The antioxidants which failed to prevent fading or discoloration are as follows:

| Structure | Name |
|---|---|
| 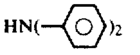 | Diphenyl amine |
| 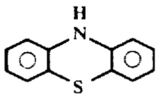 | Thiodiphenyl amine |
| 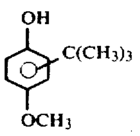 | t-Butyl-4-methoxyphenol (a mixture of the ortho and meta isomers) |
| 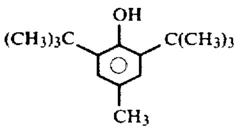 | 2,6-Di-t-butyl-p-cresol |

-continued

| Structure | Name |
|---|---|
| 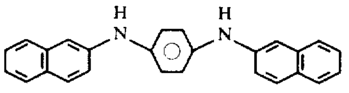 | N,N'—Di-2-naphthyl-p-phenylene diamine |
| 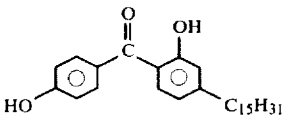 | 2,4'-Dihydroxy-6-n-pentadecyl benzophenone |
| $C_{12}H_{25}NH_2$ | Dodecyl amine |
| 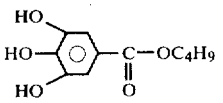 | Butyl-3,4,5-trihydroxy-benzoate |
| 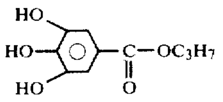 | Propyl-3,4,5-trihydroxy-benzoate |
| 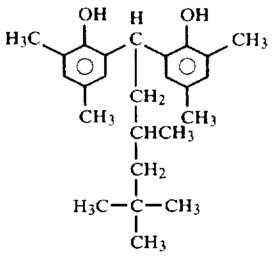 | Bis(2-hydroxy-3,5-dimethylphenyl)-2,4,4-trimethyl pentyl methane |
| 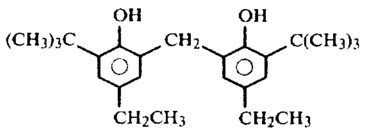 | 2,2'-Methylene-bis(4-ethyl-6-t-butyl phenol) |
| 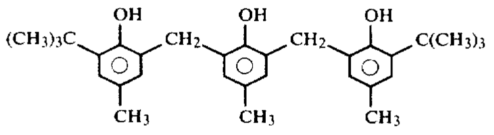 | 2,6-Bis(2'-hydroxy-3'-t-butyl-5'-methyl-benzyl)-40 methyl phenol |
|  | Thiourea |

As previously mentioned, the stabilizing agent may be present in the system of the present invention as part of the color-forming composition, i.e., in admixture with the unreacted leuco dye, or as part of the color-developing composition, i.e., in admixture with the acidic coreactant material. It is preferred that the stabilizing agent be part of the color-developing composition, as greater image stability is achieved. When the stabilizing agent is present as part of the color-forming composition, it may be in admixture with the leuco dye, and is preferably encapsulated with the leuco dye and a solvent vehicle in substantially impermeable pressure-rupturable microcapsules. Alternatively, the stabilizing agent and the leuco dye are encapsulated separately.

Yet another alternative is to encapsulate either the leuco dye or the stabilizing agent and carry the unencapsulated material on the same carrier with the capsules by applying it in solution to the carrier, and allowing it to dry.

When the stabilizing agent is present as part of the color-developing composition it is preferably applied to the carrier in solution with the acidic material, and dried on the carrier. Alternatively, the acidic material and the stabilizing agent may be coencapsulated, or either one or both may be separately encapsulated and carried on the same carrier.

It is preferred to have between about 0.25 g and 3.0 g of stabilizing agent per gram of leuco dye. It is more preferred to have between about 0.75 g and 2.0 g of stabilizing agent per gram of dye.

Leuco Dye

The stabilizing agent of the present invention is useful to prevent fade or discoloration of images produced by reaction of leuco dyes and acid color-developer materials. Exemplary leuco dyes which produce images susceptible to fade or discoloration include malichite green lactone and di-amino substituted fluoran compounds, such as 2-octylamino-6-diethylaminofluoran, 3'-methyl-2'-(phenylamino)-6'-(1-pyrrolidinyl)-spiro[iso benzofuran-1(3H),9'-[9H]xanthene]-3-one, and 6'-(cyclohexyl methyl amino)-3'-methyl-2'-(phenylamino)-spiro[isobenzo-fluoran-1-(3H),9'-[9H]xanthene]-3-one. Leuco dyes which have been found to be particularly stabilized by the stabilizing agent of the present invention include the di-amino substituted fluoran compound, 2-octylamino-6-diethylaminofluoran and 2,6-diphenyl-4-(p-dimethylaminophenyl)pyridine, commercially available as "React Yellow R" from BASF.

Preferably the leuco dye is carried in an organic solvent vehicle which serves as a reaction implementing medium for the color-forming composition and the color-developing composition. Suitable organic solvents are selected from those solvents for which the leuco dye has a solubility of at least 1% by weight. As examples of solvents which fulfill the above criteria, mention may be made of cyclohexane, diethyl phthalate, toluene, xylene, 3-heptanone, dimethyl phthalate and the like, and mixtures thereof. Particularly preferred solvents include cyclohexane and diethyl phthalate.

The leuco dye is preferably present in the solvent vehicle in a concentration of from about 0.1 to 8.0 percent by weight, and most preferably in a concentration of about 3.5 to 4.5 percent by weight. At a concentration of less than about 0.1 percent by weight no visible image upon reaction with the color-developing composition is observed. The maximum concentration of the leuco dye is a function of its solubility in the selected solvent. For example when a 1:1 solution of diethyl phthalate and cyclohexane is employed as the solvent the maximum concentration of 2-octylamino-6-diethylaminofluoran, and 2,6-diphenyl-4-(p-dimethylaminophenyl)pyridine are about 15 percent by weight and 8 percent by weight, respectively.

Acidic Color-Developer

The acidic color-developers are well known in the art, i.e., U.S. Pat. No. 3,672,935; U.S. Pat. No. 2,972,547; U.S. Pat. No. 3,244,548; British Pat. No. 1,459,417; and British Pat. No. 1,356,402. Typical color-developes include attapulgus clay, silton clay, silica, bentonite, zeolite, halloysite, aluminum oxide, aluminum phosphate, kaolin or any acidic clay, organic compounds such as succinic acid, tannic acid, gallic acid, o-hydroxy benzoic acid, and p-hydroxy benzoic acid, or an acid reacting polymeric material such as a phenolic polymer, a phenol-aldehyde polymer, an alkylphenolacetylene resin, a maleic acid-rosin resin or a partially or wholly hydrolysed polymer or maleic anhydride with styrene, ethylene, vinyl methyl ether or carboxy polymethylenes, and acid reacting monomeric materials such as p,p'-isopropyl-idenediphenol, commonly known as "bisphenol-A".

Preferred acidic color-developers of the phenolic type include p-p'-isopropyl-idenediphenol and a novolak resin commercially available as "CKWB 9869" from Union Carbide Corporation, Chicago, Illinois.

Preferred acidic color-developers of the acid clay type include an acid treated montmorillonite clay commercially available as "Copisil" from Süd Chemie, Munich, Germany.

It is preferred to have at least about 1 g of acidic color-developer per gram of leuco dye. It is most preferred to have between about 3 and 30 grams of acidic color-developer per gram of dye.

Preferably the color-developer is a composition comprising both an acid clay and a phenolic material. Where such a composition is employed it is preferred that the ratio of acid clay to phenolic material be between about 1 to 1 to 30 to 1 on a by weight basis. It is more preferred that the ratio of acid clay to phenolic polymer be about 6 to 1 on a by weight basis.

The color-forming compositions of the present invention are preferably maintained in non-reactive isolation from the color-developer by microencapsulating the color-forming composition. Microcapsules may be formed from any substantially impermeable film-forming material sufficiently strong to withstand necessary handling. A particularly suitable class of film-forming materials are aldehyde condensation polymers, and particularly urea-formaldehyde condensation polymers such as those disclosed in U.S. Pat. No. 3,516,941. The capsules are preferably in a size range of from 1 to 50 microns.

Black Images

In a preferred embodiment of the present invention a system is provided which is capable of providing various colored images, including neutral black images. By neutral black it is meant that the image has strong absorbance throughout the range between about 450 and 650 nm. Neutral black can, alternatively, be conveniently described by use of a Hunter Color difference meter, commercially available from Hunterlab, Reston, Virginia. This meter measures Hunter "L", "a" and "b" numbers. The Hunter "L" number is a measure of image lightness and is equal to $100\times(\text{Reflectance})^{\frac{1}{2}}$. "L" may vary from a value of 100 (the image is white and reflects most of the light), to a value of 0 (the image is black and absorbs most of the light). The Hunter "a" and "b" numbers measure the chromaticity of the image. A positive "a" value is a measure of redness, an "a" value close to 0 is a measure of the grayness of the image, and a negative "a" value is a measure of image greeness. A negative value of "b" measures the blueness of the image, a value of "b" close to 0 is a measure of the grayness of the image, and a positive value of "b" measures the yellowness of the image. Hunter "L", "a" and "b" numbers are more thoroughly described in "The Measurement of Appearance", Richard S. Hunter, Hunterlab, Reston, Virginia (1972), which publication is incorporated herein by reference. By neutral black it is meant that the Hunter "L" number is about 65 or less, and the Hunter "a" and "b" numbers are between about +3 and −3.

The preferred system comprises (a) a color-forming composition, containing at least one leuco dye in admixture with a compound selected from the group consisting of dithiooxamide, N-N'-dibenzyldithiooxamide, N,N'-bis(2-octanoyloxyethyl)dithiooxamide and di-dodecyl dithiooxamide, and (b) a color-developing composition containing an acidic coreactant for the leuco dye and a transition metal ion coreactant for the dithiooxamide compound. It is known that dithiooxamide (hereinafter referred to as DTO) and its derivatives, e.g., the dibenzyl or dioctanoyl oxyethyl derivatives of dithiooxamide (hereinafter DBDTO and DOEDTO respectively), and di-dodecyl DTO, complex with transition metal ions derived from transition metal salts, e.g. nickel 2-ethyl-hexoate or the like, to provide a purple image (U.S. Pat. No. 3,516,846 and Canadian Pat. No. 780,358). The combination of a DTO-transition metal ion imaging system with one of two image producing systems of the present invention described hereinafter provides a neutral black imaging system.

In one black image producing system the color-forming composition comprises 2-octylamino-6-diethylaminofluoran, and DTO and/or DTO derivatives. The color-developing composition comprises an acidic coreactant for the leuco dye and a coreactant transition metal ion for the DTO material. The reaction between the 2-octylamino-6-diethylaminofluoran and the acidic coreactant produces a green colored product. This green colored product in combination with the blue-purple colored product produced by the reaction of the DTO material and the transition metal ion, produces a neutral black appearing image.

Another black image system is provided by a color-forming composition comprising DTO and/or DTO derivatives and the leuco dye 2,6-diphenyl-4-(p-dimethylaminophenyl)pyridine in admixture with the leuco dye crystal violet lactone, and a color-developing composition comprising an acidic coreactant for the leuco dyes and a coreactant transition metal ion for the DTO. The reaction between the 2,6-diphenyl-4-(p-dimethylaminophenyl)pyridine and the acidic coreactant produces a yellow colored product. The reaction between the crystal violet lactone and the acidic coreactant produces a blue colored product. Those colored products in combination with the blue-purple colored product produced by the reaction of DTO with the transition metal ion results in the production of a neutral black appearing image.

The ratio of leuco dyes to DTO and/or DTO derivatives and the ratio of acidic coreactant to transition metal ion must be carefully controlled in the color-forming and color-developing composition to control the rates of reaction and to achieve the desired neutral black image. The ratio of DTO to leuco dye is preferably between about 1:3 and 3:1 by weight, and most preferably the ratio is between about 3:2 and 2:3. Additionally, when the leuco dye used to form a black image is a mixture of 2,6-diphenyl-4-(p-dimethylaminophenyl)pyridine and crystal violet lactone, the ratio of 2,6-diphenyl-4-(p-dimethylaminophenyl)pyridine to crystal violet lactone is preferably between about 2:1 and 1:2 on a by weight basis, and is most preferably about 1:1 on a by weight basis.

The ratio of acidic coreactant to transition metal ion in the color-developing composition is normally unimportant since an excess of both is normally used. However, it is preferred to have a ratio of acidic coreactant to transition metal ion of between about 140:5 to 2:5 by weight, and it is most preferred to have a ratio of between about 70:5 and 5:5 by weight.

Additionally, the reaction-implementing solvents must be carefully chosen to control the color-forming reaction rates and achieve the desired neutral black image. A solvent must not be chosen that will inhibit either the DTO-transition metal ion, or leuco dye-acidic material reactions. Preferably the solvents are a mixture of diethyl phthalate and cyclohexane, preferably in a 1:1 ratio, neat diethyl phthalate, xylene, and toluene.

In a preferred embodiment, either the color-forming or color-developing composition, or both, contain an effective image stabilizing amount of 2,2-methylene-bis(4-methyl-6-t-butyl phenol) to prevent fading of the black image.

In the trade, the carbonless transfer and record sheets are often designated by the terms CF, CB and CFB which stand respectively for coated front, coated back, and coated front and back sheets. Typically, the CB sheet will carry the color-forming composition, preferably encapsulated in a cosolvent vehicle. This CB sheet will overlie a CF sheet typically having a coating of the color-developing composition on its surface. When the capsules are ruptured by pressure, such as by a pen, typewriter, or the like, the color-forming composition flows onto the CF sheet and reacts with the color-developing composition to form a localized colored area corresponding to the impacted area. Alternatively, both coreactants may be encapsulated and located either in adjacent sheets in superposable relationship or on the same surface of a single sheet. As can be appreciated, CFB sheets can be interposed between the CB and CF sheets described above. Further, the top sheet can also be a CFB sheet so that markings on its obverse surface can be made using carbonless chemistry transferred from a separate carrier such as a transfer ribbon. Moreover, the surface of each sheet may be fully or partially covered by the color-forming compositions.

In one known application of this technology a color-forming composition is transferred from a ribbon by impact printing techniques to a CF record sheet which carries on its surface a color-developing composition. Visible images will appear on the portions of the CF record sheet where the color-forming composition contacts the color-developing composition.

In another known application of this technology, the color-forming composition and a cosolvent vehicle could be absorbed in a porous pad for subsequent transfer to a record surface carrying a color-developing composition by a transfer means such as a portion of the human body, e.g. a finger, palm, foot or toe, for providing fingerprints or the like.

While it is customary to coat capsules containing a color-forming composition on the back surface and coat a color-developer on the front surface, this procedure could be reversed if desired. With some systems, e.g. those using urea-formaldehyde polymer shelled capsules (U.S. Pat. No. 3,516,941) coatings need not be used at all, and the coreactive ingredients may be carried in the sheets themselves, or one may be carried in one of the sheets and the other may be carried as a surface coating.

EXAMPLE 1

Urea-formaldehyde microcapsules containing the leuco dye 2-octylamino-6-diethylaminofluoran were prepared as follows:

The urea-formaldehyde solution was prepared by heating 1855 g of 37 percent formaldehyde, 695 g urea, and 10.3 g triethanol amine at 71° C. for 2½ hours with agitation. At the end of the 2½ hour period, the hot precondensate solution was diluted with 3160 g soft water.

The capsule fill solution consisted of:

| | Parts by Weight |
|---|---|
| 2-Octylamino-6-diethylaminofluoran | 4.0 |
| Diethyl phthalate | 45.0 |
| Cyclohexane | 51.0 |
| | 100.0 |

To make capsules, 4500 ml precondensate solution and 450 g sodium chloride were charged to an 8 liter beaker and the solution was continuously agitated. The solution was neutralized (pH~7) with 12.5 percent hydrochloric acid, and 1100 g of fill solution was added. The temperature was adjusted to 20° C. and the stirrer was adjusted to 4000 rpm. The pH of the solution was slowly reduced, by the addition of 12.5 percent HCl, to about 1.80 over a 30 minute period. One hour after the end of the acid addition the temperature was increased to 63° C., and the reaction was allowed to proceed for an additional 1¾ hours, at which point it was neutralized with ammonia (aq).

EXAMPLE 2

Urea-formaldehyde microcapsules containing the leuco dye, 2,6-diphenyl-4-(p-dimethylaminophenyl)-pyridine were prepared as in Example 1, except that the capsule fill solution consisted of

| | Parts by Weight |
|---|---|
| 2,6-diphenyl-4-(p-dimethylaminophenyl)-pyridine | 4.0 |
| Xylene | 96.0 |

EXAMPLE 3

Urea-formaldehyde microcapsules containing the leuco dye, crystal violet lactone were prepared as in Example 1, except that the capsule fill solution consisted of

| | Parts by Weight |
|---|---|
| Crystal violet lactone | 4.0 |
| Xylene | 96.0 |

EXAMPLE 4

The following example illustrates the stabilizing effect of the stabilizing agent, 2,2'-methylene-bis(4-methyl-6-t-butyl phenol) when it is present on the CF sheet.

The following CF coating formulations were prepared. Coating Formulation No. 2 contained the stabilizing agent while Coating Formulation No. 1 did not.

| CF Coating Formulation No. 1 | |
|---|---|
| Water | 161.0 g |
| Acid treated montmorillonite clay | 60.0 g |
| Kaolin clay | 40.0 g |
| Styrene-butadiene latex (50 percent by weight in water) | 24.0 g |
| | 285.0 g |
| **CF Coating Formulation No. 2** | |
| Water | 149.0 g |
| Acid treated montmorillonite clay | 60.0 g |
| Kaolin clay | 36.0 g |
| Styrene-butadiene latex (50 percent by weight in water) | 24.0 g |
| 2,2'-methylene-bis(4-methyl-6-t-butyl phenol)* (25 percent by weight) | 16.0 g |
| | 285.0 g |

*This dispersion was prepared by ball milling 25 g of 2,2'-methylene-bis(4-methyl-6-t-butyl phenol) and 75 g of a 1 percent (by weight) solution of polyvinyl alcohol in water, overnight.

Each CF coating formulation was coated on bond paper with a Number 6 wire wound coating rod and oven dried at 50° C. for two minutes, to provide CF sheets.

The capsules prepared in Examples 1-3 were coated on bond paper to provide CB sheets, by the following procedure. A coating slurry was prepared by mixing 15 grams of the capsule slurry and 65 grams of a 1 percent sodium alginate solution in water. This slurry was coated at a wet thickness of 3 mil onto bond paper with a knife coater and oven dried at 50° C. for 2 minutes.

Each type of CB sheet was placed adjacent to each type of CF sheet and imaged by pressure. The densities of the images produced on the CF sheets were measured with a MacBeth densitometer both immediately after imaging and after the imaged CF sheets were exposed to fluorescent light (500 cp) for 24 hours. The image colors and densities are reported below in Table I.

TABLE I

| | CF Sheet | | | | | | | |
|---|---|---|---|---|---|---|---|---|
| | Coating Formulation No. 1 | | | | Coating Formulation No. 2 | | | |
| | O.D. | | Image Color | | O.D. | | Image Color | |
| CB Sheet | Initial | After Exposure | Initial | After Exposure | Initial | After Exposure | Initial | After Exposure |
| Capsules from Example No. 1 containing 2-octylamino-6-diethylaminofluoran | 0.31 | 0.17 | Gray-green | Red | 0.33 | 0.22 | Gray-green | Green |
| Capsules from Example No. 3 containing crystal violet lactone | 0.27 | 0.36 | Blue | Blue | 0.30 | 0.27 | Blue | Blue |
| Capsules from Example No. 2 containing 2,6-diphenyl-4-(p-dimethyl- | 0.50 | 0.24 | Yellow | Yellow | 0.52 | 0.40 | Yellow | Yellow |

TABLE I-continued

| CB Sheet | CF Sheet | | | | | | | |
|---|---|---|---|---|---|---|---|---|
| | Coating Formulation No. 1 | | | | Coating Formulation No. 2 | | | |
| | O.D. | | Image Color | | O.D. | | Image Color | |
| | Initial | After Exposure | Initial | After Exposure | Initial | After Exposure | Initial | After Exposure |
| aminophenyl)pyridine | | | | | | | | |

Table I illustrates that the stabilizing agent, 2,2'-methylene-bis(4-methyl-6-t-butyl phenol) reduces fade and prevents discoloration of images produced with 2-octylamino-6-diethylaminofluoran. In the absence of 2,2'-methylene-bis(4-methyl-6-t-butyl phenol) the gray-green image was reduced in intensity by 0.14 density units after exposure to the fluorescent light. In addition the image changed from gray-green to red. In the presence of about 3% by weight 2,2'-methylene-bis(4-methyl-6-t-butyl phenol) the image was reduced in intensity by only 0.11 density units after exposure, and the image remained gray-green.

2,2'-Methylene-bis(4-methyl-6-t-butyl-phenol) also reduced the fade of images produced by 2,6-diphenyl-4-(p-dimethylaminophenyl)pyridine. As shown in Table I, in the absence of 2,2'-methylene-bis(4-methyl-6-t-butyl phenol) the yellow image lost 0.26 density units after exposure to the fluorescent light, but in the presence of about 3% by weight 2,2'-methylene-bis(4-methyl-6-t-butyl phenol) the image lost only 0.12 density units after exposure. The yellow image displayed no change of color, even in the absence of the stabilizing agent.

The image produced by crystal violet lactone does not appear to fade or discolor. Therefore the effect of the stabilizing agent cannot be illustrated with this lueco dye.

EXAMPLE 5

The following example illustrates the stabilizing effect of 2,2'-methylene-bis(4-methyl-6-t-butyl phenol) when it is coencapsulated with 2-octylamino-6-diethylaminofluoran.

Urea-formaldehyde capsules were prepared according to the procedure of Example 1, except that the capsule fill solution consisted of

| | Parts by Weight |
|---|---|
| Capsule Fill Solution No. 1 | |
| 2-octylamino-6-diethylaminofluoran | 3.0 |
| Diethyl phthalate | 45.0 |
| Cyclohexane | 52.0 |
| | 100.0 |
| Capsule Fill Solution No. 2 | |
| 2-octylamino-6-diethylaminofluoran | 3.0 |
| 2,2'-methylene-bis(4-methyl-6-t-butyl phenol) | 2.8 |
| Diethyl phthalate | 45.0 |
| Cyclohexane | 49.2 |
| | 100.0 |

Except for the amount of cyclohexane and the presence of 2,2'-methylene-bis(4-methyl-6-t-butyl phenol), capsule fill solution No. 2 is identical to solution No. 1.

CB sheets were prepared from both capsule fill solutions by coating a mixture of 15 g of the capsule slurry and 65 g of 1 percent by weight sodium alginate solution in water on bond paper at 3 mil wet thickness.

CF sheets containing acid treated montmorillonite clay were prepared as follows:

| | | |
|---|---|---|
| Solution A: | Oxidized Starch Solution (25% by weight in water) | 222 g |
| | $Ni(NO_3)_2.6H_2O$ | 9 g |
| Solution B: | Water | 70 g |
| | Sodium rosinate | 15 g |
| | Thiourea | 5 g |
| | 50 percent by weight NaOH in water | 7.5 g |
| | 2-Ethyl hexoic acid | 12.4 g |
| Solution C: | Nopcosant L* | 1.8 g |
| | Acid treated montmorillonite clay | 140 g |
| | Water | 480 g |

*A dispersing agent which is a naphthalene sulfonated derivative commercially available from Nopco Chemicals, a division of Diamond Shamrock Co., Morristown, N.J.

Solution B was added to Solution A with vigorous agitation. After mixing for 20 minutes, Solution C was added and mixing continued for 15 minutes. The resulting mixture was coated on bond paper with a Number 8 wire wound coating rod and oven dried for 2 minutes at 50° C.

Each CB sheet was imaged on the CF and produced a green image. These samples were then exposed to fluorescent light (500 c.p.) for 24 hours. The image produced by capsule fill solution No. 1, the fill solution without the stabilizing agent, 2,2'-methylene-bis(4-methyl-6-t-butyl phenol), was initially gray-green but changed to red after exposure to the fluorescent light. By contrast, the image produced by capsule fill solution No. 2, the fill solution containing 2,2'-methylene-bis(4-methyl-6-t-butyl phenol), remained gray-green even after exposure to the fluorescent light.

The intensity and color of the images produced by both fill solutions were measured with a Hunter Color difference meter, Model #D25-2, commercially available from Hunterlab, Reston, Va., and are reported below in Table II.

TABLE II

| Capsule fill solution | Hunter "L"[1] | | Hunter "a"[2] | |
|---|---|---|---|---|
| | Initially | After Exposure | Initially | After Exposure |
| No. 1 (no 2,2'-methylene-bis(4-methyl-6-t-butyl phenol)) | 73.5 | 71.3 | −5.6 | +6.1 |
| No. 2 (2.8 percent by weight of 2,2'-methylene-bis-(4-methyl-6-t-butyl phenol)) | 71.6 | 68.8 | −6.3 | −1.8 |

[1]The Hunter "L" number is a measure of image density and is equal to $100 \times (\text{Reflectance})^{\frac{1}{2}}$

[2]The Hunter "a" number is a measure of color. The more negative "a", the greener the color. The more positive "a", the redder the color.

Table II illustrates that where no 2,2'-methylene-bis(4-methyl-6-t-butyl phenol) was present in the capsule fill (capsule fill solution No. 1) the image changed from its initial green color, to a red color after exposure, i.e., the Hunter "a" number changed from −5.6 to +6.1. By contrast where 2,2'-methylene-bis(4-methyl-6-t-butyl phenol) was present, (capsule fill solution No. 2) the image remained green, i.e., the Hunter "a" number did not change from a negative to a positive number. The presence of 2,2'-methylene-bis(4-methyl-6-t-butyl phenol) did not appear to have an effect on the image density, i.e., the Hunter "L" number.

EXAMPLE 6

A self-contained imaging handsheet was prepared utilizing bleached sulfite pulp at 1.57 percent solids and 80° SR (Schopper-Riegler freeness), and the capsules listed below.

| Capsule Fill | Parts by Weight |
|---|---|
| N,N'—bis(2-octanoyloxyethyl)dithiooxamide | 4.6 |
| N,N'—dibenzyl dithiooxamide | 1.0 |
| 2-octylamino-6-diethylamino fluoran | 2.4 |
| 2,2'-methylene-bis(4-methyl-6-t-butyl phenol) | 2.8 |
| Diethyl phthalate | 45.0 |
| Cyclohexane | 44.2 |

Urea-formaldehyde microcapsules were prepared from the capsule fill solution by the method of Example 1.

The following materials were mixed in the order listed, with a 1-2 minute mixing time between additions.

| Material | |
|---|---|
| Pulp | 635 ml |
| Capsules | 4 g |
| 10% $NiSo_4.6H_2O$ | 4 ml |
| 10% Sodium rosinate | 8 ml |
| Water | 1365 ml |

400 Ml of this slurry was diluted to 3300 ml in an 8×8 inch handsheet mold, and the sheet was formed on a 100 mesh wire. The sheet was pressed between blotter stock and dried on a hot can drier. The sheet was then coated with a 10 percent by weight solution of salicyclic acid in alcohol and air dried. When marked by pressure, an immediate black image is produced which does not change in intensity or color (as perceived visually) after 24 hours exposure, in ambient room conditions, to a 100 f.c. fluorescent light.

EXAMPLE 7

A manifolding paper capable of producing neutral black is made as follows:

Urea-formaldehyde capsules were prepared containing the following fill solution.

| | Parts by Weight |
|---|---|
| N,N'—bis(2-octanoyloxyethyl)dithiooxamide | 1.0 |
| N,N'dibenzyl dithiooxamide | 3.0 |
| 2-octylamino-6-diethylaminofluoran | 4.0 |
| Diethyl phthalate | 45.0 |
| Cyclohexane | 47.0 |
| | 100.00 |

15 G of the capsule slurry and 65 g of 1 percent sodium alginate solution in water were combined and coated on bond paper at a 3 mil wet thickness and oven dried for 2 minutes at 50° C., to produce CB sheets.

CF sheets were prepared as follows. CF formulation No. 2 contained the stabilizing agent 2,2'-methylene-bis(4-methyl-6-t-butyl phenol), while CF formulation No. 1 did not.

| CF Formulation No. 1 | | |
|---|---|---|
| Solution A: | Oxidized starch (25% by weight in water) | 222 g |
| | $Ni(NO_3)_2.6H_2O$ | 9 g |
| Solution B: | Water | 70 g |
| | Sodium rosinate | 15 g |
| | Thiourea | 5 g |
| | NaOH (50% by weight in water) | 7.5 g |
| | 2-ethyl hexoic acid | 12.4 g |
| Solution C: | Acid treated montmorillonite clay | 140.0 g |
| | Nopcosant ® L | 1.8 g |
| | p-p'-isopropylidenediphenol (25% by weight dispersion in water) | 40.0 g |
| | Water | 552.6 g |

CF Formulation No. 2

Identical to CF formulation No. 1, except that 40 g of a 25 percent by weight dispersion of 2,2'-methylene-bis(4-methyl-6-t-butyl phenol) in 1 percent by weight polyvinyl alcohol in water, prepared as in Example 4, was added after Solutions "A", "B" and "C" were mixed.

Solutions "A," "B" and "C" were combined as in Example 5 and the pH was adjusted to 7 with 10% by weight NaOH. The resulting mixtures were coated on bond paper with a Number 10 wire wound coating rod and oven dried at 50° C. for 2 minutes to produce CF sheets.

The CB sheet was imaged against both CF sheets. The image color, as perceived visually, and the Hunter "L," "a" and "b" numbers, both of the initial image and the image after exposure to a 500 c.p. fluorescent light for 18½ hours, are reported in Table III.

TABLE III

| CF Formulation | Image Color (as perceived visually) Initial | Image Color After Exposure | Hunter "L" Initial | Hunter "L" After Exposure | Hunter "a" Initial | Hunter "a" After Exposure | Hunter "b" Initial | Hunter "b" After Exposure |
|---|---|---|---|---|---|---|---|---|
| No. 1 (without stabilizing agent) | Black | Purple | 47.1 | 49.0 | +1.9 | +8.3 | −3.4 | −1.9 |
| No. 2 (with stabilizing agent) | Black | Black | 47.6 | 49.1 | +1.8 | +1.2 | −4.0 | 0.4 |

Table III illustrates that where no stabilizing agent was present in the CF coating (CF formulation No. 1) the image changed from a neutral black, to a reddish black after exposure, i.e. the Hunter "a" number changed from +1.9 to +8.3). By contrast where the stabilizing agent was present (CF formulation No. 2) the image remained a neutral black and did not exhibit a reddish tinge after exposure, i.e., the Hunter "a" number changed from +1.8 to +1.2. The presence of the stabilizing agent does not appear to have significantly affected the image density (the Hunter "L" number) or the amount of blue in the image (the Hunter "b" number).

EXAMPLE 8

This example illustrates that the phenolic stabilizing agent of the present invention does not react with leuco dyes to form a colored product.

CF sheets were prepared by the following procedure. CF coating formulation No. 2 contained the stabilizing agent 2,2'-methylene-bis(4-methyl-6-t-butyl phenol), while CF coating formulation No. 1 contained no stabilizing agent.

| CF Coating Formulation No. 1 | |
|---|---|
| Water | 161.0 g |
| Kaolin clay | 100.0 g |
| Styrene butadiene latex (50 percent by weight in water) | 24.0 g |
| | 285.0 g |

| CF Coating Formulation No. 2 | |
|---|---|
| Water | 101.0 g |
| Kaolin clay | 80.0 g |
| Styrene-butadiene latex (50 percent by weight in water) | 24.0 g |
| 2,2'-methylene-bis(4-methyl-6-t-butyl phenol) dispersion (25 percent by weight*) | 80.0 g |
| | 285.0 g |

*Prepared as in Example 4

Each CF coating formulation was coated on bond paper with a No. 6 wire wound coating rod and dried at 50° C. for 2 minutes.

The capsules prepared in Example 1-3 were coated on bond paper to provide CB sheets, by the following procedure. A coating slurry was prepared by mixing 15 grams capsule slurry and 65 grams of a 1 percent by weight sodium alginate solution in water. This slurry was knife coated at a wet thickness of 3 mil onto bond paper and dried at 50° C. for two minutes.

Each CB sheet was placed adjacent to each type of CF sheet and the CF sheets were imaged by pressure. The optical densities (O.D.) of the resulting weak images were measured with a MacBeth densitometer and are reported below in Table IV. For the CB sheets containing the capsules of Examples 1 and 3 a neutral density (Visual) Wratten #106 filter was used. For the CB sheets containing the capsules of Example 2 a blue Wratten #47 filter was used.

TABLE IV

| CB Capsules | CF Coating Formulation No. 1 | CF Coating Formulation No. 2 |
|---|---|---|
| From Example 1, containing 2-octylamino-6-diethylamino-fluoran | 0.14 O.D. | 0.15 O.D. |
| From Example 2, containing "React Yellow R" | 0.10 O.D. | 0.08 O.D. |
| From Example 3, containing crystal violet lactone | 0.10 O.D. | 0.11 O.D. |

This example illustrates that the phenolic stabilizing agent, has no effect on the optical density of the image produced by the reaction of a leuco dye and kaolin clay. Thus, 2,2'-methylene-bis(4-methyl-6-t-butyl phenol) does not react to form a colored image with leuco dyes.

EXAMPLE 9

The following example illustrates that 2,2'-methylene-bis(4-methyl-6-t-butyl phenol) is unique among antioxidants in its ability to reduce the light induced fade of the image produced when 2-octylamino-6-diethylamino fluoran is reacted with acid treated montmorillonite clay.

CF sheets were prepared according to the procedure of Example 5 except that, after solutions "A", "B" and "C" were mixed, to 75 g of this mixture was added 2 g of a 25% by weight dispersion of antioxidant in water. The antioxidants utilized are listed in Table V below. The resulting mixture was coated on bond paper with a No. 10 wire wound coating rod and oven dried for 2 minutes at 50° C.

A CB sheet was prepared according to the following procedure. 15 Grams of the capsule slurry prepared in Example 1 were mixed with 65 grams of 1% sodium alginate in water. This slurry was knife coated at a wet thickness of 3 mil onto bond paper and oven dried at 50° C. for 2 minutes.

The CF and CB sheet were superimposed and the CF sheet was imaged by pressure. The color of the images produced (as perceived visually), both initially and after 24 hours under a 500 c.p. fluorescent light, are reported in Table V below.

TABLE V

| Structure | Name | Color (as perceived visually) Initially | Color (as perceived visually) After Exposure |
|---|---|---|---|
| | No antioxidant (control) | Green | Pink |
| 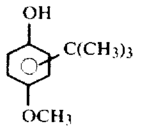 | t-Butyl-4-methoxyphenol (a mixture of the ortho and meta isomers) | Green | Pink |
| 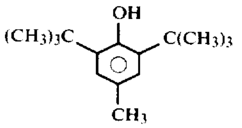 | 2,6-Di-t-butyl-p-cresol | Green | Pink |

TABLE V-continued

| Structure | Name | Color (as perceived visually) Initially | Color (as perceived visually) After Exposure |
|---|---|---|---|
| 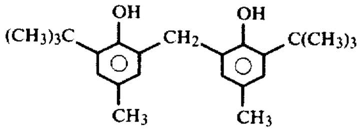 | 2,2-methylene-bis(4-methyl-6-t-butyl phenol) | Green | Green |
| 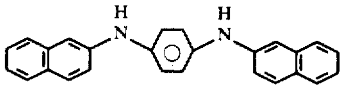 | N,N'—Di-2-naphthyl-p-phenylene diamine | Green | Pink |
| 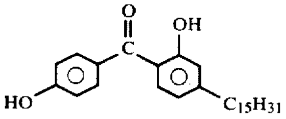 | 2,4'-Dihydroxy-6-n-pentadecyl benzophenone | Green | Pink |
| $C_{12}H_{25}NH_2$ | Dodecyl amine | Green | Gray |
| 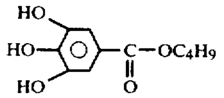 | Butyl-3,4,5-trihydroxybenzoate | Green | Gray |
| 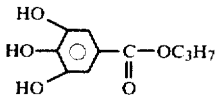 | Propyl-3,4,5-trihydroxybenzoate | Green | Gray |
| 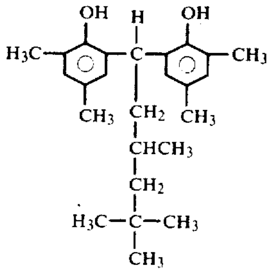 | Bis-(2-hydroxy-3,5-dimethyl-phenyl)-2,4,4-trimethyl-pentyl methane | Green | Pink |
| 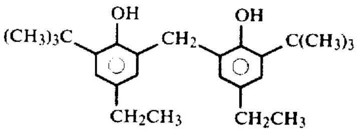 | 2,2'-methylene-bis(4-ethyl-6-t-butyl phenol) | Green | Pink |
| 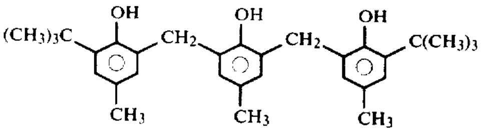 | 2,6-Bis(2'-hydroxy-3'-t-butyl-5'-methyl-benzyl)-4-methyl phenol | Green | Pink |
|  | Thiourea | Green | Pink |

This example illustrates that only 2,2'-methylene-bis(4-methyl-6-t-butyl phenol) reduces fade of 2-octylamino-6-diethylaminofluoran and allows it to remain green. The ability of the image to remain green is important in the production of a stable, fade resistant black image.

What is claimed is:

1. A color-forming composition which is substantially colorless, but which is capable of reacting with acidic coreactant materials to produce stable, fade-resistant colored products comprising at least one leuco dye compound which is fadeable or discolorable after development, and a stabilizing agent, carried in an organic solvent vehicle, wherein said stabilizing agent is 2,2'-methylene-bis(4-methyl-6-t-butyl phenol).

2. The composition of claim 1 wherein said leuco dye is selected from the group consisting of 2-octylamino-6-diethylaminofluoran and 2,6-diphenyl-4-(p-dimethylaminophenyl)pyridine.

3. The composition of claim 1 wherein said color-forming composition additionally comprises a compound selected from the group consisting of dithiooxamide, derivatives of dithiooxamide, and mixtures thereof, which is capable of forming colored complexes with transition metal salts.

4. An article for providing an image-forming composition comprising a carrier means carrying a color-forming composition comprising at least one leuco dye which is fadeable or discolorable after development, and a stabilizing agent carried in an organic solvent vehicle, said stabilizing agent being 2,2'-methylene-bis(4-methyl-6-t-butyl-phenol).

5. The article of claim 4 wherein said leuco dye is selected from the group consisting of 2-octylamino-6-diethylaminofluoran and 2,6-diphenyl-4-(p-dimethylaminophenyl)pyridine.

6. The article of claim 4 wherein said color-forming composition also comprises an effective image producing amount of a compound selected from the group consisting of dithiooxamide, derivatives of dithiooxamide, and mixtures thereof.

7. The article of claim 4 wherein said carrier means is a transfer ribbon.

8. The article of claim 4 wherein said carrier means is a paper sheet.

9. The article of claim 8 wherein said color-forming composition is contained in substantially impermeable pressure rupturable capsules.

10. A manifold form comprising at least two sheets connected along a common edge wherein at least one of said sheets is the article according to claim 8.

11. A record sheet comprising a paper sheet having on at least a portion of one major surface a mixture of a color-forming composition, a color-developing composition and a stabilizing agent, wherein said color-forming composition is maintained in non-reactive isolation from said color-developing composition by microencapsulating either said color-forming composition or said color-developing composition in substantially impermeable pressure-rupturable microcapsules with an organic solvent vehicle; said color-forming composition comprising at least one leuco dye which is fadeable or discolorable after development, said color-developing composition comprising an acidic coreactant material capable of reacting with said color-forming composition to provide colored products, and said stabilizing agent being 2,2'-methylene-bis(4-methyl-6-t-butyl phenol).

12. A record sheet comprising a paper sheet having (a) substantially impermeable pressure-rupturable microcapsules containing a color-forming composition in a solvent vehicle within said paper sheet, said color-forming composition comprising at least one leuco dye which is fadeable or discolorable after development;

(b) a color-developing composition on at least a portion of one major surface of said paper sheet, said color-developing composition comprising an acidic coreactant material capable of reacting with said color-forming composition to provide colored products; and (c) a stabilizing agent carried in a composition selected from the group consisting of said color-developing composition and said color-forming composition, said stabilizing agent being 2,2'-methylene-bis(4-methyl-6-t-butyl phenol).

13. A system for forming stable, fade-resistant colored markings from a substantially colorless color-forming composition and a substantially colorless color-developing composition comprising:

(a) a carrier means carrying said color-forming composition, said color-forming composition comprising at least one leuco dye which is fadeable or discolorable after development, carried in an organic solvent vehicle;

(b) a record sheet having on at least a portion of one major surface said color-developing composition comprising an acidic coreactant material capable of reacting with said color-forming composition to provide colored products;

(c) a stabilizing agent carried in a composition selected from the group consisting of said color-forming composition and said color-developing composition, said stabilizing agent being 2,2'-methylene-bis-(4-methyl-6-t-butyl phenol); and (d) transfer means for transferring at least a portion of said color-forming composition to selected areas of said record sheet having said color-developing composition thereon.

14. The system of claim 13 wherein said color-forming composition additionally comprises an effective image producing amount of a compound selected from the group consisting of dithiooxamide, derivatives of dithiooxamide, and mixtures thereof, and wherein said color-developing composition additionally comprises an effective image producing amount of a transition metal salt.

15. A system for forming stable, fade-resistant neutral black colored markings from a substantially colorless color-developing composition comprising:

(a) a carrier means carrying said color-forming composition, said color-forming composition comprising a leuco dye composition, said leuco dye composition being selected from the group consisting of 2-octylamino-6-diethylaminofluoran, and a mixture of 2,6-diphenyl-4-(p-dimethylaminophenyl)-pyridine with crystal violet lactone, and a compound selected from the group consisting of N,N'-dibenzyl dithiooxamide, N,N'-bis(2-octanoyloxyethyl)-dithiooxamide, di-dodecyl dithiooxamide, and mixtures thereof, in an organic solvent;

(b) a record sheet having on at least a portion of one major surface an acidic coreactant material capable of reacting with said leuco dye composition to form colored products, and a transition metal salt capable of reacting with said dithiooxamide compound to form a blue-purple colored product;

(c) a stabilizing agent carried in a composition selected from the group consisting of said color-developing composition and said color-forming composition, said stabilizing agent being 2,2'-methylene-bis-(4-methyl-6-t-butyl phenol); and (d) transfer means for transferring at least a portion of said color-forming composition to selected areas of said record sheet having said color-developing composition thereon.

* * * * *